United States Patent [19]

Désor et al.

[11] Patent Number: 5,596,035
[45] Date of Patent: Jan. 21, 1997

[54] AQUEOUS POLYMER DISPERSIONS AS BINDERS FOR NON-BLOCKING SCRATCH-RESISTANT AND CHEMICAL-RESISTANT COATINGS

[75] Inventors: Ulrich Désor, Idstein; Stephan Krieger, Hofheim; Rolf Kuropka, Bad Soden; Bernhard Momper, Idstein, all of Germany

[73] Assignee: Hoechst Aktiengesellschaft, Frankfurt, Germany

[21] Appl. No.: 339,273

[22] Filed: Nov. 10, 1994

[30] Foreign Application Priority Data

Nov. 30, 1993 [DE] Germany .................. 43 40 648.3

[51] Int. Cl.$^6$ .......................................... C08L 19/02
[52] U.S. Cl. .................. 524/460; 524/521; 524/555
[58] Field of Search ............................ 524/521, 460, 524/555

[56] References Cited

U.S. PATENT DOCUMENTS

| | | | |
|---|---|---|---|
| 4,654,397 | 3/1987 | Mueller-Mall | 524/460 |
| 4,894,261 | 1/1990 | Gulbins et al. | 427/379 |
| 4,952,623 | 8/1990 | Auchter et al. | 524/517 |

FOREIGN PATENT DOCUMENTS

| | | |
|---|---|---|
| 31064/89 | 9/1989 | Australia . |
| 466409 | 1/1992 | European Pat. Off. . |
| 0466409 | 1/1992 | European Pat. Off. . |

OTHER PUBLICATIONS

Biangardi et al., "Transparente Polymere Mehrphasensysteme", Makromol. Chem. 183, (1990), pp. 221–241.

Houben–Weyl, "Methods of Organic Chemistry", G. Thieme–Verlag, Stuttgart, 4th Edition, vol. E 20, (1987), pp. 1154–1155.

Primary Examiner—Jeffrey T. Smith
Attorney, Agent, or Firm—Foley & Lardner

[57] ABSTRACT

Autocrosslinking aqueous dispersions characterized by an MFT of from 0° to about 50° C. include at least one carbonyl-containing soft latex polymer having an MFT of below about 20° C., at least one hard latex polymer having an MFT of above about 25° C., and at least one polyfunctional carboxylic hydrazide. The aqueous polymer dispersions are used as binders for non-blocking, scratch-resistant and chemical-resistant coatings and as binders for clear coat and pigmented coating systems.

15 Claims, No Drawings

AQUEOUS POLYMER DISPERSIONS AS BINDERS FOR NON-BLOCKING SCRATCH-RESISTANT AND CHEMICAL-RESISTANT COATINGS

BACKGROUND OF THE INVENTION

1. Field of the Invention

The present invention relates to a dispersion that is autocrosslinking at room temperature, is composed of a mixture of at least two latex polymers of different glass transition temperature (Tg) and comprises a crosslinking agent that is active as the dispersion forms a film. The present invention is further directed to a process for the preparation of this dispersion and also to a method of using this dispersion as a binder for non-blocking, scratch-resistant and chemical-resistant coatings for, in particular, wood and plastics.

2. Description of Background Art

It is known from EP-A 0 466 409 that, by mixing a soft dispersion containing a latex polymer having a Tg of less than 20° C. with a hard dispersion containing a latex polymer having a Tg in the range from 25° to 65° C., a binder is obtained that forms a film at room temperature without the addition of volatile organic solvents and which is used in highly blocking-resistant coatings. A disadvantage of these coatings, however, is their low resistance to chemical action, e.g., on contact with cleaning agents and beverages. A further disadvantage of these coatings is their low scratch resistance.

It is also known from EP-B 0 332 011 that, by mixing a hard dispersion prepared by stepwise emulsion copolymerization and having a minimum filming temperature (MFT) of from 65° to 110° C. with a softer dispersion having a MFT of from 20° to 60° C., viscoelastic, transparent and sandable films are obtained that are particularly suitable for the coating of wood. However, because of the relatively high MFT of the softer dispersion in this case, a relatively large quantity of a filming auxiliary must be used in order to ensure that the corresponding mixture forms a film at room temperature.

Moreover, EP-B 0 184 091 discloses that it is possible, by multistage emulsion polymerization, to prepare aqueous, autocrosslinking polymer dispersions that have a low MFT and form films of high blocking resistance. However, these films have deficiencies in terms of low scratch resistance.

SUMMARY OF THE INVENTION

The present invention relates to a dispersion, a method of preparing the dispersion, and a method of using the dispersion that avoids the drawbacks and problems of the prior art, and is directed to an aqueous polymer dispersion that satisfies and meets the need for a binder for non-blocking, scratch-resistant and chemical-resistant coatings without the shortcomings and disadvantages of the prior art in a safe and cost-effective manner.

Accordingly, an object of the present invention is to provide a dispersion whose MFT is in the range of 0° to 50° C. so that little or no amount of filming auxiliaries is required in the coating formulation in order to ensure the formation of a film at room temperature, and which is suitable for the preparation of coatings which possess both a high blocking resistance and good resistance to scratching and to household chemicals.

Another object of the present invention is to provide a method of preparing such a dispersion.

A further object of the present invention is to provide a method of using such a dispersion as a binder in a coating system.

Additional objects and advantages of the invention will be set forth in part in the description which follows and in part will be obvious from the description, or may be learned by practice of the invention. The objects and advantages of the invention may be realized and attained by means of the elements and combinations particularly pointed out in the appended claims.

To achieve the objects and in accordance with the purpose of the invention, as embodied and broadly described herein, the aqueous dispersion of the present invention comprises an aqueous dispersion containing a soft latex polymer A having carbonyl groups, a dispersion containing at least one hard latex polymer B and a polyfunctional carboxylic hydrazide C. Specifically, the aqueous dispersion of the present invention has an MFT of from 0° to 50° C. and comprises at least one carbonyl-containing, soft latex polymer A having an MFT of below 20° C., at least one hard latex polymer B having an MFT of above 25° C. and at least one polyfunctional carboxylic hydrazide C.

In another embodiment of the present invention, a method of preparing the aqueous dispersion comprises mixing at least one dispersion comprising a latex polymer A synthesized beforehand by emulsion polymerization, at least one dispersion comprising a latex polymer B synthesized beforehand by emulsion polymerization, and at least one polyfunctional carboxylic hydrazide C.

In another embodiment of the present invention, a method of using the aqueous dispersion comprises adding the aqueous dispersion as a binder in a coating system, preferably a clearcoat or pigmented coating system, for coating woods and/or plastics.

It is to be understood that both the foregoing general description and the following detailed description are exemplary and explanatory only and are not restrictive of the invention, as claimed.

DETAILED DESCRIPTION OF THE PREFERRED EMBODIMENTS

Reference will now be made in detail to preferred embodiments of the invention.

It has now been found that a suitable dispersion is obtained by mixing at least one dispersion comprising a soft latex polymer A which contains carbonyl groups, and at least one dispersion comprising a hard latex polymer B, with a polyfunctional carboxylic hydrazide C.

The present invention therefore relates to an aqueous dispersion having an MFT of from 0° to 50° C. and comprising at least one carbonyl-containing, soft latex polymer A having an MFT of below 20° C., at least one hard latex polymer B having an MFT of above 25° C. and at least one polyfunctional carboxylic hydrazide C.

In the dispersion according to the invention the latex polymers A and B are preferably present in a ratio of from 30:70 to 70:30, in particular from 40:60 to 60:40.

The dispersion comprising the soft latex polymer A preferably has an MFT of from 0° to 19° C., in particular from 5° to 16° C. The latex polymer A is preferably composed of the following monomer units:

a) from 99 to 60% by weight, preferably from 95 to 75% by weight, of acrylic esters and/or methacrylic esters and/or styrene and/or styrene derivatives, b) from 0.5 to 5% by weight, preferably from 1 to 3% by weight, of α,β-unsaturated monocarboxylic acids and/or dicarboxylic acids, c) from 0.5 to 30% by weight, preferably from 1 to 10% by weight, of carbonyl-containing α,β-unsaturated compounds, and d) from 0 to 5% by weight, preferably from 0 to 3% by weight, of α,β-unsaturated carboxamides.

The dispersion comprising the hard latex polymer B preferably has an MFT of greater than 50° C., in particular from 70° to 110° C. The latex polymer B is preferably composed of the following monomer units:

a) from 99.5 to 70% by weight, preferably from 95 to 75% by weight, of acrylic esters and/or methacrylic esters and/or styrene and/or styrene derivatives, b) from 0.5 to 5% by weight, preferably from 1 to 3% by weight, of α,β-unsaturated monocarboxylic acids and/or dicarboxylic acids, c) from 0 to 20% by weight, preferably from 0.5 to 10% by weight, of carbonyl-containing α,β-unsaturated compounds, and d) from 0 to 5% by weight, preferably from 0 to 3% by weight, of α,β-unsaturated carboxamides.

Particularly suitable components a) are acrylic and methacrylic esters of $C_1$–$C_{12}$ monoalcohols, preferably $C_1$ to $C_8$ monoalcohols, for example ethyl acrylate, isopropyl acrylate, butyl acrylate, 2-ethylhexyl acrylate, methyl methacrylate and butyl methacrylate, and also styrene and alkyl-substituted styrenes, preferably styrene and vinyltoluene. By appropriate selection of the proportions of monomers that are known to promote softness, for example, butyl acrylate and ethylhexyl acrylate, with monomers that are known to promote hardness, for example, methyl methacrylate and styrene, the MFT of the dispersion can in each case be tailored so as to give a soft latex polymer A having an MFT<20° C. and a hard latex polymer B having an MFT>25° C. The monomers that promote hardness and softness are conventionally used, and the effect of the respective proportions on the MFT of the resulting dispersion, are described in, for example, Houben-Weyl, Methoden der Organischen Chemie [Methods of Organic Chemistry], 4th Edition, Volume E 20, pp. 1154–1155, G. Thieme-Verlag, Stuttgart 1987, the disclosure of which is hereby incorporated by reference in its entirety.

As α,β-unsaturated mono- and/or dicarboxylic acids b), preference is given to using acrylic acid, methacrylic acid and itaconic acid.

In accordance with the invention, suitable carbonyl-containing α,β-unsaturated compounds c) preferably contain at least one aldehyde or keto function, examples being acrolein, methacrolein, diacetone acrylamide, diacetone methacrylamide, 2-butanone methacrylate and vinyl acetoacetate.

Acrylamide and methacrylamide are preferably employed as α,β-unsaturated carboxamides d).

Polyfunctional carboxylic hydrazides C which, along with the latex polymers A and B, are likewise part of the dispersion according to the invention, preferably possess at least two hydrazide groups, examples being adipic dihydrazide, oxalic dihydrazide, isophthalic dihydrazide and polyacrylic polyhydrazide. The polyfunctional carboxylic hydrazides C are preferably present in the dispersion in a molar ratio of the hydrazide groups to the sum of the carbonyl groups introduced into A and B via monomers c) of from 1:10 to 10:1, preferably from 1:5 to 5:1.

The present invention also relates to a process for the preparation of the aqueous dispersion and comprises mixing at least one dispersion comprising a latex polymer A, at least one dispersion comprising a latex polymer B and at least one polyfunctional carboxylic hydrazide C.

The dispersions comprising the latex polymers A and B are preferably each prepared separately by emulsion polymerization. In this process the monomers are emulsified and polymerized in the aqueous phase in the presence of emulsifiers and initiators at temperatures of from 60° to 95° C.

In the dispersions, based on the content of polymer, the conventionally used amounts of up to 3% by weight, preferably up to 2% by weight, of ionic emulsifiers and up to 6% by weight, preferably up to 4% by weight, of nonionic emulsifiers should not be substantially exceeded. Examples of nonionic emulsifiers used are alkyl polyglycol ethers, ethoxylation products of lauryl, oleyl or stearyl alcohol, of straight-chain or branched synthetic alcohols or of mixtures such as coconut fatty alcohol, alkylphenol polyglycol ethers, for example ethoxylation products of octylphenol or nonylphenol, diisopropylphenol, triisopropylphenol or of di- or tri-tert-butylphenol, or ethoxylation products of polypropylene oxide. Suitable ionic emulsifiers are primarily anionic emulsifiers. These may be the alkali metal or ammonium salts of alkyl, aryl or alkylaryl sulfates or phosphates, or of alkyl-, aryl- or alkylarylsulfonates or -phosphonates, or compounds having other anionic end groups, which may also contain oligo- or polyethylene oxide units between the hydrocarbon radical and the anionic group. Typical examples are sodium lauryl sulfate, sodium octylphenol glycol ether sulfate, sodium dodecylbenzenesulfonate, sodium lauryl diglycol sulfate, ammonium tri-tert-butylphenol pentaglycol sulfate or ammonium tri-tert-butylphenol octaglycol sulfate.

Protective colloids that are used, if desired, may be natural substances, for example gum arabic, starch, alginates or modified natural substances, for example methyl-, ethyl-, hydroxyalkyl- or carboxymethylcellulose or synthetic substances, for example polyvinyl alcohol, polyvinylpyrrolidone or mixtures of such substances. Preferably, it is possible to use modified cellulose derivatives and synthetic protective colloids. The possibility of using these protective colloids, however, is limited when the monomer systems described are used, as is known to the person skilled in the art. The quantities which can be used are generally frequently low, for example from 0.001 to 1% by weight, and the compatibility and nature of the addition must be tested in each separate case.

In order to initiate and continue the polymerization, use is generally made of oil-soluble and/or, preferably, water-soluble free-radical initiators or redox systems. Suitable examples are hydrogen peroxide, sodium peroxodisulfate, potassium peroxodisulfate or ammonium peroxodisulfate, dibenzoyl peroxide, lauryl peroxide, tri-tert-butyl peroxide, and azobisisobutyronitrile, alone or together with reducing components, for example sodium bisulfite, ®Rongalit (formaldehyde sodium sulfoxylate), glucose, ascorbic acid and other compounds having a reducing action.

Furthermore, it is possible to use regulators, such as thiols, and other conventional auxiliaries which are known to the person skilled in the art for emulsion polymerization. The preparation of the high-quality dispersions according to the present invention furthermore presupposes the employment of the measures which are generally known in the area of emulsion polymerization, to the extent that they are not described herein.

In accordance with the invention the dispersions containing the latex polymers A and B are mixed, preferably in a ratio of from 70:30 to 30:70, in particular from 60:40 to 40:60, based on the solids content of the respective dispersion, such that the MFT of the resulting polymer dispersion is within the range from 0° to 50° C., preferably within the range from 0° to 30° C. In order to obtain particularly transparent films, it is possible to proceed in analogy with the comments of H. J. Biangardi, H. Sturm, G. Kostersitz in Angew. Makromol. Chem. 183 (1990), 221–241, the disclosure of which is hereby incorporated by reference in its entirety, with regard to transparent polymeric multiphase systems, by mixing latex polymers A and B having similar refractive indices and latex particle diameters of less than 100 nm.

The dispersion comprising the latex polymer A, the dispersion comprising the latex polymer B, and the polyfunctional carboxylic hydrazide C can be combined in any desired sequence. It is also possible to add the polyfunctional carboxylic hydrazide C actually during the preparation of the respective dispersion, to one or both dispersions.

The present invention relates furthermore to the use of the dispersion according to the invention as a binder for clearcoats and pigmented coating systems.

On the basis of the dispersion according to the present invention, compositions for coating wood or plastics can be prepared. These compositions can be prepared with the use of conventional additives, such as wetting agents, for example aminomethylpropanol, antifoams, for example silicones and mineral oils, thickeners based on polyacrylates or polyurethanes, waxes based on paraffin or polyethylene, filming auxiliaries, for example ®Texanol (aliphatic ester, Eastman) or butyldiglycol, preservatives, matting agents and other additives known to the person skilled in the art.

The dispersion according to the present invention crosslinks even at room temperature and thus brings about, when used in coating systems, improved film properties, and in particular a scratch resistance and blocking resistance which are distinctly increased with respect to conventional dispersion mixtures.

EXAMPLES

The parts and percentages stated in the following examples are by weight unless otherwise stated. To test the blocking resistance, hiding-power cards from The Leneta Company, New York, are coated with the dispersion (50 μm wet-film thickness). After drying for 24 hours at room temperature, two coated cards are placed with their coated sides against one another and subjected to a load of $3.1 \times 10^4$ N/m² (0.32 kp/cm²) for 1 h at 40° C. Subsequently the force required to separate the cards from one another is determined.

EXAMPLE 1

Dispersion A1

A monomer emulsion is first prepared, into which 390 parts of water,
13 parts of the sodium salt of $C_{11}$ alkyl ether sulfate with about 7 ethylene oxide units (45%),
15 parts of methacrylic acid,
375 parts of methyl methacrylate,
375 parts of butyl acrylate, and
23 parts of diacetone acrylamide, are stirred using a high-speed stirrer until a stable emulsion is formed. Then, in an appropriate reaction vessel, 400 parts of water,
13 parts of the sodium salt of $C_{11}$ alkyl ether sulfate with about 7 ethylene oxide units (45%), and
50 parts of the monomer emulsion are heated to 83° C., and 0.4 parts of ammonium peroxodisulfate in 10 parts of water are added. Subsequently the remaining monomer emulsion is metered in over the course of 3.5 hours together with 2.3 parts of ammonium peroxodisulfate dissolved in 40 parts of water. Heating is continued for 60 minutes, and then the mixture is cooled. The pH is adjusted to 9.0 using a 25% strength ammonia solution. The solids content of the dispersion is about 48% and the MFT is about 15° C.

Dispersion B1

Dispersion B1 is prepared by analogy with dispersion A1, but using the following monomer emulsion:

390 parts of water,
13 parts of the sodium salt of $C_{11}$ alkyl ether sulfate with about 7 ethylene oxide units (45%),
15 parts of methacrylic acid,
675 parts of methyl methacrylate,
75 parts of butyl acrylate, and
23 parts of diacetone acrylamide.

The solids content of dispersion B1 is about 48% and the MFT is>50° C.

500 Parts of dispersion A1 and 500 parts of dispersion B1 are mixed thoroughly with 7 parts of adipic dihydrazide. The resulting dispersion has a solids content of about 48% and an MFT of about 20° C.

EXAMPLE 2

Dispersion A2

As described in Example 1 a stable monomer emulsion is first prepared, having the following composition:

397 parts of water,
13 parts of the sodium salt of $C_{11}$ alkyl ether sulfate with about 7 ethylene oxide units (45%),
15 parts of methacrylic acid,
413 parts of methyl methacrylate,
337 parts of ethylhexyl acrylate, and
30 parts of diacetone acrylamide, In an appropriate reaction vessel
400 parts of water,
13 parts of the sodium salt of $C_{11}$ alkyl ether sulfate with about 7 ethylene oxide units (45%), and
50 parts of the monomer emulsion are heated to 83° C., and 0.4 parts of ammonium peroxodisulfate in 10 parts of water are added. Subsequently the remaining monomer emulsion is metered in over the course of 3.5 hours together with 2.3 parts of ammonium peroxodisulfate dissolved in 40 parts of water. Heating is continued for 60 min more and then the mixture is cooled. The pH is adjusted to 9.0 using a 25% strength ammonia solution. The solids content of the dispersion is about 48% and the MFT is about 17° C.

Dispersion B2

Dispersion B2 is prepared in much the same way as dispersion A2 is prepared, but using the following monomer emulsion:

373 parts of water,
13 parts of the sodium salt of $C_{11}$ alkyl ether sulfate with about 7 ethylene oxide units (45%),
15 parts of methacrylic acid,
675 parts of methyl methacrylate,
75 parts of ethylhexyl acrylate, and
8 parts of diacetone acrylamide.

The solids content of the dispersion B1 is about 48% and the MFT is >50° C.

550 Parts of dispersion A2 and 450 parts of dispersion B2 are thoroughly mixed and are admixed with 6 parts of adipic dihydrazide. The resulting dispersion has a solids content of about 48% and an MFT of about 23° C.

EXAMPLE 3: (Comparative Example)

Two dispersions A3 and B3 are prepared in much the same way as Example 1, but with the difference that no diacetoneacrylamide is used in the respective monomer emulsions. Moreover, no adipic dihydrazide is added after the dispersions have been mixed.

The resulting dispersion has a solids content of about 48% and an MFT of about 20° C.

EXAMPLE 4: (Comparative Example)

Dispersion A4

A monomer emulsion is first prepared, into which 390 parts of water,
13 parts of the sodium salt of $C_{11}$ alkyl ether sulfate with about 7 ethylene oxide units (45%),
15 parts of methacrylic acid,
413 parts of methyl methacrylate,
337 parts of butyl acrylate, and
23 parts of diacetone acrylamide are stirred using a high-speed stirrer until a stable emulsion is formed. Then, in an appropriate reaction vessel, 400 parts of water,
13 parts of the sodium salt of $C_{11}$ alkyl ether sulfate with about 7 ethylene oxide units (45%), and
50 parts of monomer emulsion are heated to 83° C., and 0.4 parts of ammonium peroxodisulfate in 10 parts of water are added. Subsequently, the remaining monomer emulsion is metered in over the course of 3.5 hours together with 2.3 parts of ammonium peroxodisulfate dissolved in 40 parts of water. Heating is continued for 60 min more and then the mixture is cooled. The pH is adjusted to 9.0 using a 25% strength ammonia solution. Subsequently, 7 parts of adipic dihydrazide are thoroughly mixed into 1000 parts of the dispersion. The solids content of the resulting dispersion is about 48% and the MFT is about 20° C.

EXAMPLE 5: (Comparative Example)

Two monomer emulsions A5 and B5 are first prepared, in two separate vessels, as follows:

For Monomer Emulsion A5

195 parts of water,
7 parts of the sodium salt of $C_{11}$ alkyl ether sulfate with about 7 ethylene oxide units (45%),
8 parts of methacrylic acid,
188 parts of methyl methacrylate,
188 parts of butyl acrylate, and
12 parts of diacetone acrylamide are stirred using a high-speed stirrer until a stable emulsion is formed.

For Monomer Emulsion B5

195 parts of water,
7 parts of the sodium salt of $C_{11}$ alkyl ether sulfate with about 7 ethylene oxide units (45%),
8 parts of methacrylic acid,
338 parts of methyl methacrylate,
37 parts of butyl acrylate, and
12 parts of diacetone acrylamide are stirred using a high-speed stirrer until a stable emulsion is formed.

Then, in an appropriate reaction vessel, 400 parts of water,
13 parts of the sodium salt of $C_{11}$ alkyl ether sulfate with about 7 ethylene oxide units (45%), and
50 parts of the monomer emulsion A5 are heated to 83° C., and 0.4 parts of ammonium peroxodisulfate in 10 parts of water are added. Subsequently, the remaining monomer emulsion A5 is metered in over the course of 105 minutes, after which the monomer emulsion B5 is metered in over the course of 105 minutes. In parallel therewith, 2.3 parts of ammonium peroxodisulfate dissolved in 40 parts of water are metered in. Heating is continued for 60 min more and then the mixture is cooled. The pH is adjusted to 9.0 using a 25% strength ammonia solution. Then 7 parts of adipic dihydrazide are thoroughly mixed into 1000 parts of the dispersion. The solids content of the dispersion is about 48% and the MFT is >44° C.

EXAMPLE 6

Preparation of a Wood Varnish 745 parts of the dispersion of Example 1, 2, 3, 4 or 5,
172 parts of water,
2 parts of antifoam based on mineral oil,
10 parts of 1,2-propanediol,
10 parts of ®Texanol,
2 parts of aminomethylpropanol,
4 parts of polyurethane thickener,
25 parts of methoxybutanol, and
30 parts of 30% polyethylene wax emulsion (softening point about 100° C.)

are mixed with stirring at room temperature to form a varnish. Table 1 summarizes the properties of the varnish films.

The dispersion of Example 5 does not form a coherent film on drying at room temperature, so that no film properties are reported for it.

TABLE 1

Properties of the varnish films

|  | Example 1 | Example 2 | Example 3 | Example 4 |
|---|---|---|---|---|
| Blocking resistance[1] | 1 | 1 | 2 | 4 |
| Scratch resistance[2] | very good | good | adequate | deficient |
| König pendulum hardness [s][2] | 31 | 32 | 24 | 21 |
| Sandability[3] | good | good | moderate | moderate |
| Chemical resistance (acc. to DIN 68861 1B) | very good | very good | deficient | very good |

[1] Assessment of the force required to separate the hiding-power cards:
Rating 0: 0 N/m$^2$, Rating 1: 0.1–0.8 × 10$^4$ N/m$^2$, Rating 2: 0.81–1.6 × 10$^4$ N/m$^2$, Rating 3: 1.61–2.4 × 10$^4$ N/m$^2$, Rating 4: 2.41–3.2 × 10$^4$ N/m$^2$, Rating 5: >3.2 × 10$^4$ N/m$^2$.
[2] 300 μm (wet) of varnish applied to glass, dried for 7 days at room temperature.
[3] 300 μm of varnish applied to wood, dried for 4 hours at room temperature.

It will be apparent to those skilled in the art that various modifications and variations can be made in the coating apparatus of the present invention and in construction of this coating apparatus without departing from the scope or spirit of the invention.

Other embodiments of the invention will be apparent to those skilled in the art from consideration of the specification and practice of the invention disclosed herein. It is intended that the specification and examples be considered as exemplary only, with true scope and spirit of the invention being indicated by the following claims.

What is claimed is:

1. An aqueous dispersion having an MFT of from about 0° to 50° C., comprising at least one carbonyl-containing, soft latex polymers A having an MFT of below about 20° C.; at least one hard latex polymer B having an MFT of above about 25° C.; and at least one poly-functional carboxylic hydrazide C; said dispersion being prepared by a process comprising:

i) synthesizing beforehand at least one dispersion comprising the latex polymer A;

ii) synthesizing beforehand and separately from polymer A, at least one dispersion comprising the latex polymer B; and subsequently;

iii) mixing the at least one dispersion comprising the latex polymer A and the at least one dispersion comprising the latex polymer B; and iv) adding the polyfunctional carboxylic hydrazide C in any sequence.

2. An aqueous dispersion as claimed in claim 1, wherein the latex polymer A comprises monomer units from each of the following groups:

a) from about 99 to 60% by weight of at least one of acrylic esters, methacrylic esters, styrene and styrene derivatives, b) from about 0.5 to 5% by weight of at least one of α,β-unsaturated monocarboxylic acids and α,β-unsaturated dicarboxylic acids, c) from about 0.5 to 30% by weight of carbonyl-containing α,β-unsaturated compounds, and d) from about 0 to 5% by weight of α,β-unsaturated carboxamides and the latex polymer B comprises monomer units from each of the following groups:

a) from about 99.5 to 70% by weight of at least one of acrylic esters, methacrylic esters, styrene and styrene derivatives, b) from about 0.5 to 5% by weight of at least one of α,β-unsaturated monocarboxylic acids and α,β-unsaturated dicarboxylic acids, c) from 0 to about 20% by weight of carbonyl-containing α,β-unsaturated compounds, and d) from 0 to about 5% by weight of α,β-unsaturated carboxamides.

3. An aqueous dispersion as claimed in claim 2, wherein the latex polymer B comprises from about 0.5 to 10% by weight of carbonyl containing α,β-unsaturated compounds.

4. An aqueous dispersion as claimed in claim 1, wherein the ratio of polymer A to polymer B is from about 70:30 to about 30:70.

5. An aqueous dispersion as claimed in claim 1, wherein the ratio of polymer A to polymer B is from about 40:60 to about 60:40.

6. An aqueous dispersion as claimed in claim 1, wherein the molar ratio of hydrazide groups of the polyfunctional carboxylic hydrazide C to the sum of carbonyl groups of the soft latex polymer A and the hard latex polymer B is from about 1:10 to about 10:1.

7. An aqueous dispersion as claimed in claim 1, wherein the molar ratio of hydrazide groups of the polyfunctional carboxylic hydrazide C to the sum of carbonyl groups of the soft latex polymer A and the hard latex polymer B is from about 1:5 to about 5:1.

8. An aqueous dispersion as claimed in claim 1, wherein the MFT of the aqueous dispersion is from about 0° to 30° C.

9. A coating composition comprising a binder made of an aqueous dispersion as claimed in claim 1 and at least one wetting agent, antifoam, thickener, wax, filming auxiliary, and matting agent.

10. A coating composition as claimed in claim 9, wherein the latex polymer A comprises monomer units from each of the following groups:

a) from about 99 to 60% by weight of at least one of acrylic esters, methacrylic esters, styrene and styrene derivatives, b) from about 0.5 to 5% by weight of at least one of α,β-unsaturated monocarboxylic acids and α,β-unsaturated dicarboxylic acids, c) from about 0.5 to 30% by weight of carbonyl-containing α,β-unsaturated compounds, and d) from 0 to about 5% by weight of α,β-unsaturated carboxamides and the latex polymer B comprises monomer units from each of the following groups:

a) from about 99.5 to 70% by weight of at least one of acrylic esters, methacrylic esters, styrene and styrene derivatives, b) from about 0.5 to 5% by weight of at least one of α,β-unsaturated monocarboxylic acids and α,β-unsaturated dicarboxylic acids, c) from 0 to about 20% by weight of carbonyl-containing α,β-unsaturated compounds, and d) from 0 to about 5% by weight of α,β-unsaturated carboxamides.

11. A coating composition according to claim 9, wherein the coating composition is used in a clear coat and/or pigmented coating systems.

12. A method of coating a substrate, comprising applying a coating composition as claimed in claim 9, wherein the substrate is selected from the group consisting of wood or plastics.

13. A method of coating a substrate according to claim 12, wherein the latex polymer A comprises monomer units from each of the following groups:
   a) from about 99 to 60% by weight of at least one of acrylic esters, methacrylic esters, styrene and styrene derivatives,
   b) from about 0.5 to 5% by weight of at least one of $\alpha,\beta$-unsaturated monocarboxylic acids and $\alpha,\beta$-unsaturated dicarboxylic acids,
   c) from about 0.5 to 30% by weight of carbonyl-containing $\alpha,\beta$-unsaturated compounds, and
   d) from 0 to about 5% by weight of $\alpha,\beta$-unsaturated carboxamides and the latex polymer B comprises monomer units from each of the following groups:
   a) from about 99.5 to 70% by weight of at least one of acrylic esters, methacrylic esters, styrene and styrene derivatives,
   b) from about 0.5 to 5% by weight of at least one of $\alpha,\beta$-unsaturated monocarboxylic acids and $\alpha,\beta$-unsaturated dicarboxylic acids,
   c) from 0 to about 20% by weight of carbonyl-containing $\alpha,\beta$-unsaturated compounds, and
   d) from 0 to about 5% by weight of $\alpha,\beta$-unsaturated carboxamides.

14. A process for the preparation of an aqueous dispersion having an MFT of from about 0° to 50° C., and which includes at least one carbonyl-containing, soft latex polymers A having an MFT of below about 20° C.; at least one hard latex polymer B having an MFT of above about 25° C.; and at least one poly-functional carboxylic hydrazide C; said process comprising:
   i) synthesizing beforehand at least one dispersion comprising the latex polymer A;
   ii) synthesizing beforehand and separately from polymer A, at least one dispersion comprising the latex polymer B; and subsequently;
   iii) mixing the at least one dispersion comprising the latex polymer A and the at least one dispersion comprising the latex polymer B; and
   iv) adding the polyfunctional carboxylic hydrazide C in any sequence.

15. A process for the preparation of an aqueous dispersion accordingly to claim 14, wherein the latex polymer A is synthesized from monomer units selected from each of the following groups:
   a) from about 99 to 60% by weight of at least one of acrylic esters, methacrylic esters, styrene and styrene derivatives,
   b) from about 0.5 to 5% by weight of at least one of $\alpha,\beta$-unsaturated monocarboxylic acids and $\alpha,\beta$-unsaturated dicarboxylic acids,
   c) from about 0.5 to 30% by weight of carbonyl-containing $\alpha,\beta$-unsaturated compounds, and
   d) from about 0 to 5% by weight of $\alpha,\beta$-unsaturated carboxamides and the latex polymer B is synthesized from monomer units selected from each of the following groups:
   a) from about 99.5 to 70% by weight of at least one of acrylic esters, methacrylic esters, styrene and styrene derivatives,
   b) from about 0.5 to 5% by weight of at least one of $\alpha,\beta$-unsaturated monocarboxylic acids and $\alpha,\beta$-unsaturated dicarboxylic acids,
   c) from 0 to about 20% by weight of carbonyl-containing $\alpha,\beta$-unsaturated compounds, and
   d) from 0 to about 5% by weight of $\alpha,\beta$-unsaturated carboxamides.

* * * * *